April 29, 1924.
J. BLUE
FERTILIZER DISTRIBUTOR
Filed Nov. 24, 1920
1,492,066
2 Sheets-Sheet 1
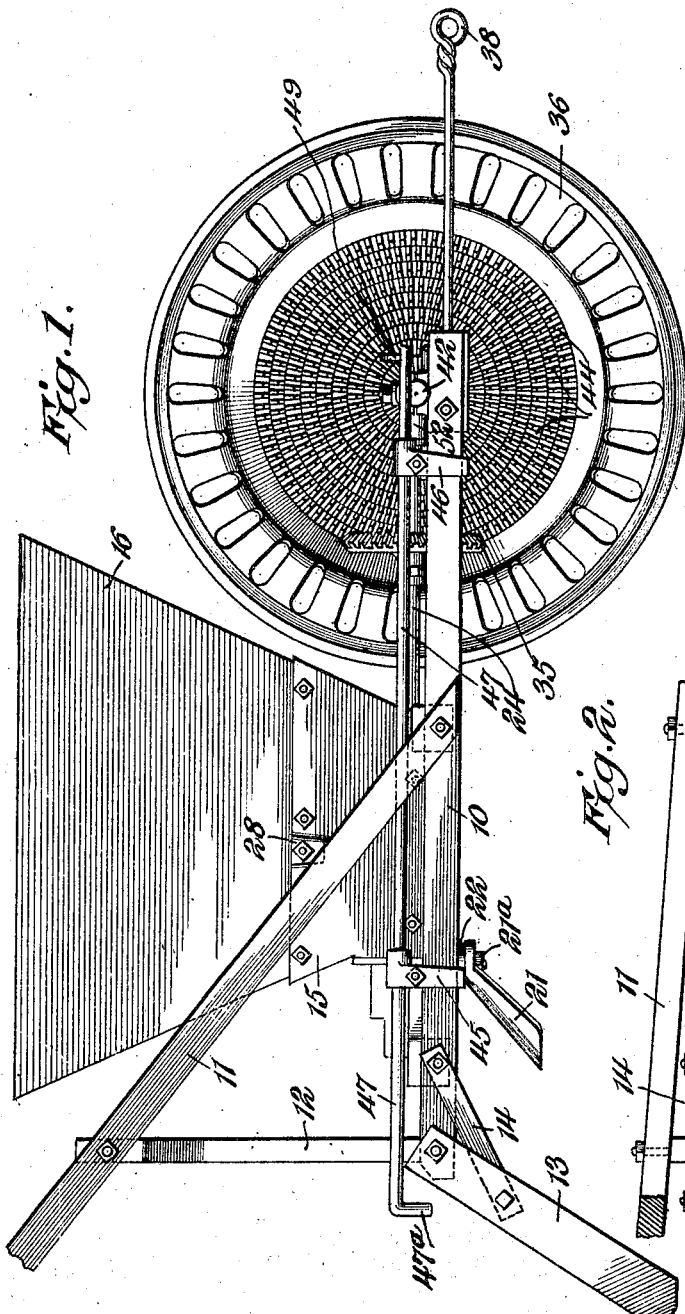
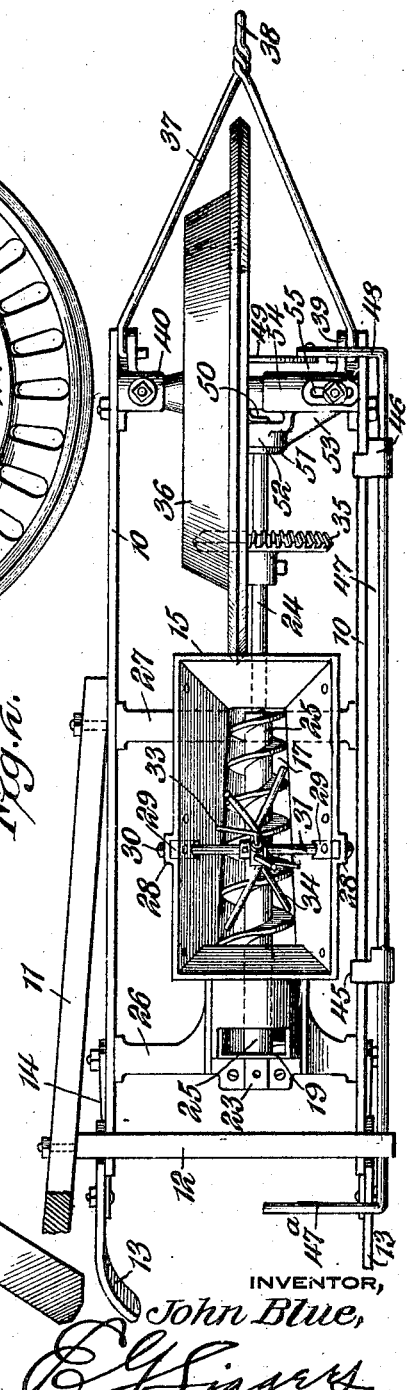
INVENTOR,
John Blue,
BY E. G. Siggers
ATTORNEY
WITNESSES
Howard D. Orr.
Philip E. Siggers April 29, 1924.
J. BLUE
FERTILIZER DISTRIBUTOR
Filed Nov. 24, 1920
1,492,066
2 Sheets-Sheet 2
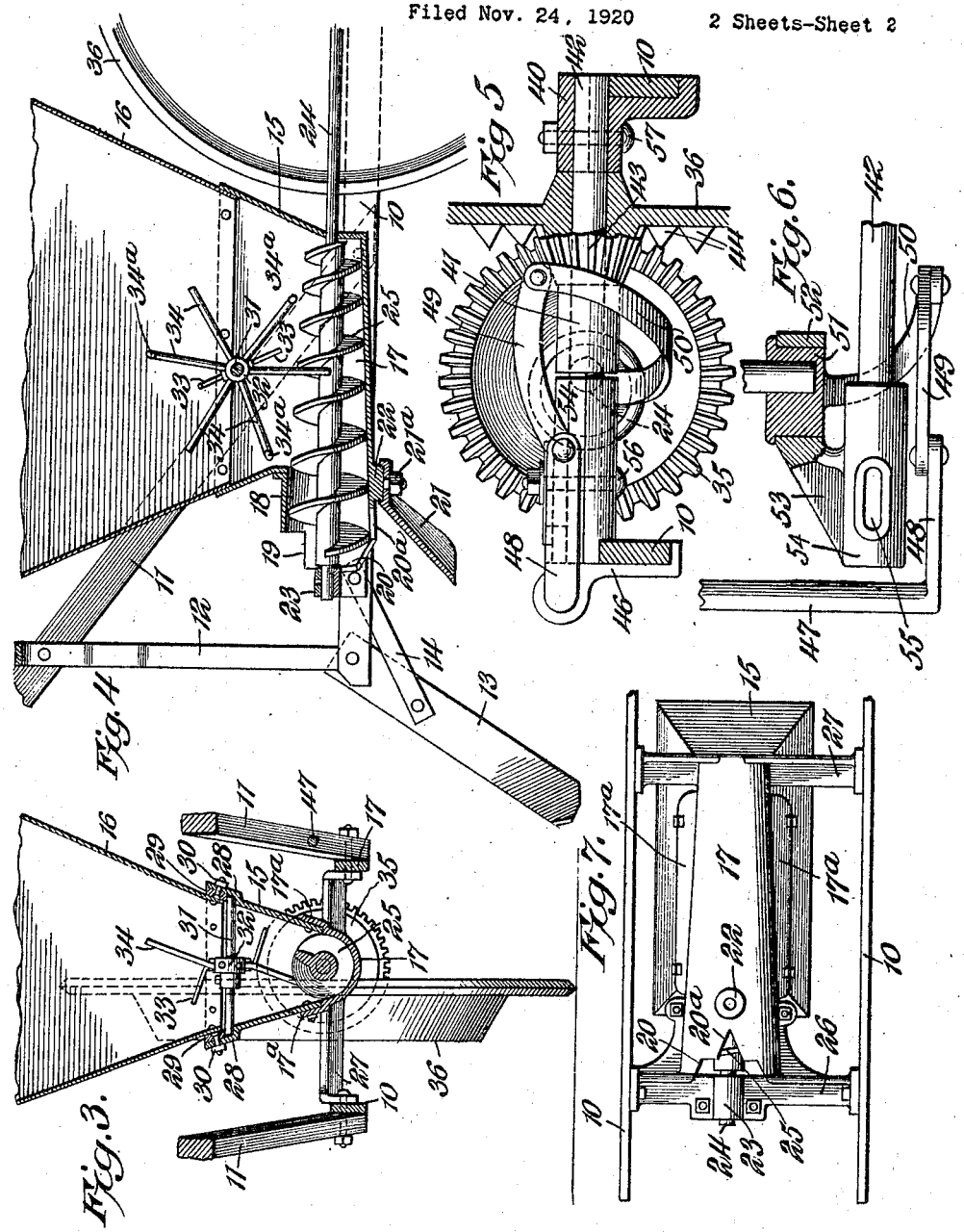
WITNESSES
Howard D. Orr
Philip E. Siggers
John Blue, INVENTOR,
BY E. G. Siggers
ATTORNEY Patented Apr. 29, 1924.

1,492,066

UNITED STATES PATENT OFFICE.

JOHN BLUE, OF LAURINBURG, NORTH CAROLINA.

FERTILIZER DISTRIBUTOR.

Application filed November 24, 1920. Serial No. 426,192.

*To all whom it may concern:*

Be it known that I, JOHN BLUE, a citizen of the United States, residing at Laurinburg, in the county of Scotland and State of North Carolina, have invented a new and useful Fertilizer Distributor, of which the following is a specification.

This invention relates to fertilizer distributors.

An object of the present invention is to provide an improved gear shifting mechanism for implements of this character.

A further object is to provide an improved stirring means and a mounting therefor.

Other objects are to improve generally the construction of fertilizer distributors so that they are more readily adapted for service under varying conditions, and so that they do their work more efficiently.

The invention will be best understood from a consideration of the following detailed description taken in connection with the accompanying drawing forming part of this specification, with the understanding, however, that the invention is not confined to any strict conformity with the showing in the drawing, but may be changed and modified so long as such changes and modifications mark no material departure from the salient features of the invention as expressed in the appended claims.

In the drawing:

Fig. 1 is a side elevation of the improved implement.

Fig. 2 is a top plan view of the same.

Fig. 3 is a vertical transverse section through the hopper.

Fig. 4 is a vertical longitudinal section through the hopper.

Fig. 5 is a detail elevation partly in section, showing the gear shifting mechanism.

Fig. 6 is a top plan view of the same.

Fig. 7 is a plan looking from underneath the hopper.

The numeral 10 designates the main frame, and 11 the handle bars thereof, a yoke 12 being connected to the handle bars and to the frame at the rear end so as to support the handle bars in the proper position. The bars 11 preferably take the form of plow handles whereby the implement may be steered as it is pulled by a draft animal. Near the rear end of the frame a pair of blades 13 are mounted properly shaped to engage with the soil to cover up the fertilizer after it has been distributed. Braces 14 are joined at opposite ends to the frame and to the blades so as to maintain them against displacement.

A hopper comprising two principal parts is mounted upon the frame midway of its ends. The casting 15 has a hopper form and supports a sheet iron hopper 16, bolts uniting the two. The sheet iron hopper may be renewed from time to time when the acid in the fertilizer has eaten it away. The cast iron hopper 15 is not affected by the acid.

The cast iron hopper 15 is in turn supported by a conveyer housing 17 which has offset flanges 17ª bolted or otherwise secured to the hopper 15. The housing 17 tapers uniformly forwardly of the implement so that its large end is at the rear. Supporting frame members 26 and 27 are preferably formed integrally with the housing 17 which may be a casting and secured to the frame 10. The frame member 26 has a bearing 23 provided for a shaft 24 extending longitudinally of the distributor. This bearing mounts the shaft so as to allow slight lateral movement of the latter when adjusted, as will be described. Secured to the shaft 24 in any desirable way is a worm conveyer 25. This worm is so shaped that it increases uniformly in diameter toward the rear end. Furthermore, the distance between adjacent convolutions of the worm increases uniformly in the same direction. The housing 17 has an extension 18 for the large end of the worm, a sight opening 19 being provided on the upper side and a discharge opening 20 on the lower side. This discharge opening includes a V-shaped reentrant perforation provided in the bottom of the housing 17.

A boss 22 protrudes from the bottom of housing 17 and is screw-threaded to receive a bolt 21ª whereby a scattering element 21 may be mounted beneath the outlet. Obviously, the position of the scatterer may be varied by loosening the bolt 21ª and turning the scatterer about the bolt as an axis. The fertilizer delivered through the outlet is spread by the inclined and transversely curved surface of the distributor so that it is not concentrated upon a small area of the soil. The blades 13 following thereafter throw earth over the fertilizer so that practically all of it is covered up.

At opposite points on the longitudinal upper edges of the casting 15, two outwardly-projecting protuberances are provided. Blocks 29 are received within the seats provided by these protuberances, which blocks are curved at their lower ends so as to fit over a stirrer shaft 31. Bolts or equivalent elements 30 unite the blocks to the casting 15 so that the stirrer shaft is held against upward movement. The protuberances 28 in connection with the blocks 29 thus provide bearings for the stirrer shaft. Midway of the ends of the shaft or rod 31 a stirrer is mounted. This stirrer includes a hub 32 which may be held to its shaft by a set screw or the like and a plurality of stirring arms 33 and 34 arranged in three sets. The arms 33 extend in lines nearly parallel to the shaft 31, these arms being designed to exert a lifting action upon the fertilizer. The arms 33, as shown, are much shorter than the arms 34. The latter arms engage with the worm whereby the stirrer is rotated. The arms 34 extend alternately in directions to the left and to the right of the hub 32 on opposite sides of the axis of the worm. Every other arm 34 has a beveled end 34$^a$, this bevel being necessary because the ends of said arms engage with the helical surface of the worm. This worm, being preferably cast, may have small imperfections in its surface which would tend to break or bend those arms provided with the beveled ends. Only the arms 34 which extend to the left of the hub 32, as the observer looks toward the front end of the implement, have beveled ends. The arms which extend to the right may be squared off since they are not engaged by the helical surface of the worm.

The shaft 24 is driven by a beveled gear 35 so mounted that it may be adjusted longitudinally of the shaft and after adjustment effect turning of the shaft. A bull wheel 36 is supported upon a stationary axle 42 secured at the forward end of the main frame. The bull wheel has a plurality of gear teeth 44 provided on one face whereby the beveled gear 35 may be driven. The hub of the bull wheel also has gear teeth 43 which may be meshed with the bevel gear 35. Both the bevel gear and the bull wheel are dished, as shown.

At the forward extremities of the frame a V-shaped bar 37 is pivotally connected. The forward extremity of the bar 37 is preferably twisted into a loop 38 providing convenient means by which a swingletree or other draft appliance may be connected to the implement. A pair of brackets 45, 46 are secured to one of the longitudinal bars of the frame and together support a gear shifting rod 47 having a bent end 47$^a$ at the rear of the main frame. By this bent end, the farmer may with his hand or with his foot, turn the rod 47 upon its axis. The other end of the rod is bent, as at 48, the ends 47$^a$, 48 being substantially parallel to each other but the end 48 being the shorter. To the extremity of the arm 48 a link 49 is pivotally connected, this link being curved longitudinally, as seen in Fig. 5. Pivotally connected to the opposite end of link 49 is an eccentric arm 50, this arm being curved both laterally and longitudinally and made fast at its other end to an eccentric 51. The eccentric 51 provides a bearing for the forward end of shaft 24, this shaft being, however, offset relative to the center of element 51, hence the name "eccentric". A loop 52 surrounds the eccentric 51 and is carried by an arm 53 forming a part of the bracket 54. This bracket is adjustably mounted upon the casting 39 and is slotted as at 55 to receive a bolt 56. The axle 42 upon which the bull wheel revolves is received within the bracket 54, the bolt 56 passing through the axle 42 whereby the position of the bracket 54 relative to the axle 42 may be varied. The other end of the axle 42 is secured by a bolt 57 to a casting 40. The casting 40 is connected to the frame and provides a pivotal mounting for the V-shaped bar 37. The other casting 39 aids in supporting the V-bar 37. The adjustment of the bracket 54 along the axle 42 is provided so that the teeth of the beveled gear may also mesh with the teeth 44 on the bull wheel. The arm 50 is so curved that it extends underneath the axle 42. The hub of the bull wheel is extended as indicated at 41. Obviously, when the rod 47 is turned on its axis by the operator, the eccentric 51 will be revolved so as to carry the shaft 24 with its beveled gear away from the gear teeth on the bull wheel. The bracket 54, while shiftable or adjustable, is in effect a fixed support; that is, it does not move when the rod 24 is moved.

The gear shift permits the operator to temporarily stop the distribution of the fertilizer, as when driving to or from the field or in making turns. Whatever the position of the gear 35 along the shaft 24, this shifting of the gear into or out of engagement with the teeth on the bull wheel is readily effected. The stirrer insures proper feed of the fertilizer to the screw conveyer, while the latter, because of its increase in size in the direction of its feed, prevents the fertilizer from caking. The implement distributes its fertilizer evenly and uniformly at any desired rate, is easily handled and transported, and is readily adapted to serve under all conditions.

This invention is an improvement on the implements patented by me December 27, 1904, No. 778,440, and August 1, 1911, No. 999,295.

What is claimed is:—

1. In a fertilizer distributor, the combination of a shaft, a gear slidable on and fixable to said shaft, a power wheel with which the gear normally engages, a rotatable eccentric bearing for said shaft at one end of the implement, a rod extending longitudinally of the implement and rockable about its axis, a laterally extending arm on the rod at the end adjacent said bearing, and means operatively connecting the arm with the bearing for effecting a partial rotation of the latter to shift said gear into and out of mesh with the power wheel when the rod is rocked.

2. In a fertilizer distributor, the combination of a shaft, a gear slidable on said shaft, means for securing the gear to the shaft, a power wheel with which the gear normally engages, a member supported near said gear for rocking movement and having an eccentric opening which forms a bearing for the shaft, a rod extending longitudinally of the implement and rockable about its axis, an arm on the end of the rod near the power wheel, a link pivotally connected to the arm, and operatively connected to the shaft to rock the latter when the rod is rocked to shift said gear into and out of mesh with the power wheel.

3. In a fertilizer distributor, the combination of a shaft, a gear mounted upon said shaft, a power wheel adapted to drive the gear, a rod extending longitudinally of the implement and rockable about its axis, an arm on the end of the rod near the power wheel, a link pivotally connected with said arm, an eccentric bearing member for the shaft supporting the same eccentrically, means connecting said link with said eccentric whereby rocking of the rod effects rocking of the bearing member, and means adjustable toward and from the power wheel for supporting the bearing member.

4. In a fertilizer distributor, the combination of a shaft, a gear mounted upon said shaft, a power wheel adapted to drive the gear, a rod extending longitudinally of the implement and rockable about its axis, an arm on the end of the rod near the power wheel, a link pivotally connected with said arm, an eccentric bearing member for the shaft supporting the same eccentrically, and an arm longitudinally and transversely curved and extending underneath the axle of the power wheel for connecting said link to the bearing member whereby rocking of said rod rocks the bearing member.

5. In a fertilizer distributor, the combination of a shaft, a gear mounted upon said shaft, a power wheel adapted to drive the gear, a rod extending longitudinally of the implement and rockable about its axis, an arm on the end of the rod near the power wheel, a link pivotally connected with said arm, an eccentric bearing member for the shaft supporting the same eccentrically, an arm longitudinally and transversely curved and extending underneath the axle of the power wheel for connecting said link to the bearing member whereby rocking of said rod rocks the bearing member, and means adjustable toward and from the power wheel for supporting the bearing member.

In testimony that I claim the foregoing as my own, I have hereto affixed my signature.

JOHN BLUE.